US012675754B2

(12) United States Patent
Miao et al.

(10) Patent No.: US 12,675,754 B2
(45) Date of Patent: Jul. 7, 2026

(54) TASK PROCESS MANAGEMENT METHOD, SYSTEM, DEVICE, AND MEDIUM

(71) Applicant: Beijing Youzhuju Network Technology Co., Ltd., Beijing (CN)

(72) Inventors: Zehao Miao, Beijing (CN); Qing Wang, Beijing (CN); Chao Xu, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 88 days.

(21) Appl. No.: 18/674,611

(22) Filed: May 24, 2024

(65) Prior Publication Data

US 2024/0394619 A1     Nov. 28, 2024

(30) Foreign Application Priority Data

May 24, 2023     (CN) .......................... 202310594838.7

(51) Int. Cl.
*G06Q 10/0631*          (2023.01)
*G06Q 10/10*            (2023.01)

(52) U.S. Cl.
CPC ..... *G06Q 10/063114* (2013.01); *G06Q 10/10* (2013.01)

(58) Field of Classification Search
CPC .. G06Q 10/063; G06Q 10/10; G06Q 10/0633; G06Q 10/06311; G06Q 10/0631; G06Q 10/063114
See application file for complete search history.

(56) References Cited

U.S. PATENT DOCUMENTS

2008/0082390 A1*   4/2008   Hawkins ............ G06Q 10/0633
                                               705/7.27
2008/0313281 A1*  12/2008   Scheidl .................. G06Q 10/06
                                               709/205

(Continued)

FOREIGN PATENT DOCUMENTS

CN          106897857 A      6/2017
CN          106897858 A      6/2017

(Continued)

OTHER PUBLICATIONS

Daniel, Florian, et al. "From people to services to ui: Distributed orchestration of user interfaces." International Conference on Business Process Management. Berlin, Heidelberg: Springer Berlin Heidelberg, 2010. (Year: 2010).*

(Continued)

*Primary Examiner* — William S Brockington, III
(74) *Attorney, Agent, or Firm* — Astute IP Law Group

(57)                ABSTRACT
The present disclosure provides a task process management method, a system, a device, a medium, and a program product. The method includes: obtaining an account type of a triggering account that triggers a viewing operation, and node information of multiple task nodes in a task process, in response to the viewing operation for the task process, wherein the node information indicates an account type set that has access permission to the task nodes; determining a target task node that matches the triggering account from the multiple task nodes according to the account type of the triggering account and the node information of the multiple task nodes in the task process; displaying the target task node in the task process to enable the triggering account to execute a triggering operation for the target task node for task processing.

18 Claims, 4 Drawing Sheets

(56)          References Cited

U.S. PATENT DOCUMENTS

| | | | | |
|---|---|---|---|---|
| 2016/0162819 A1* | 6/2016 | Hakman | ............ | G06Q 10/0633 |
| | | | | 705/7.27 |
| 2023/0050430 A1* | 2/2023 | Piau | ...................... | G06F 9/5038 |
| 2024/0211957 A1* | 6/2024 | Robinson | ............... | G06Q 10/10 |

FOREIGN PATENT DOCUMENTS

| | | | | |
|---|---|---|---|---|
| CN | 114186817 A | 3/2022 | | |
| CN | 114978601 A | 8/2022 | | |
| CN | 115564322 A | 1/2023 | | |
| CN | 115756405 A | 3/2023 | | |
| EP | 2849133 A1 * | 3/2015 | ........... | G06Q 10/103 |
| WO | 2019165371 A1 | 8/2019 | | |

OTHER PUBLICATIONS

Gesing, Sandra, et al. "Workflows in a dashboard: a new generation of usability." 2014 9th Workshop on Workflows in Support of Large-Scale Science. IEEE, 2014. (Year: 2014).*
International Search Report and Written Opinion for PCT Patent Application No. PCT/CN2024/090566, mailed Jul. 5, 2024, 11 pages, with Partial English Translation attached.

* cited by examiner

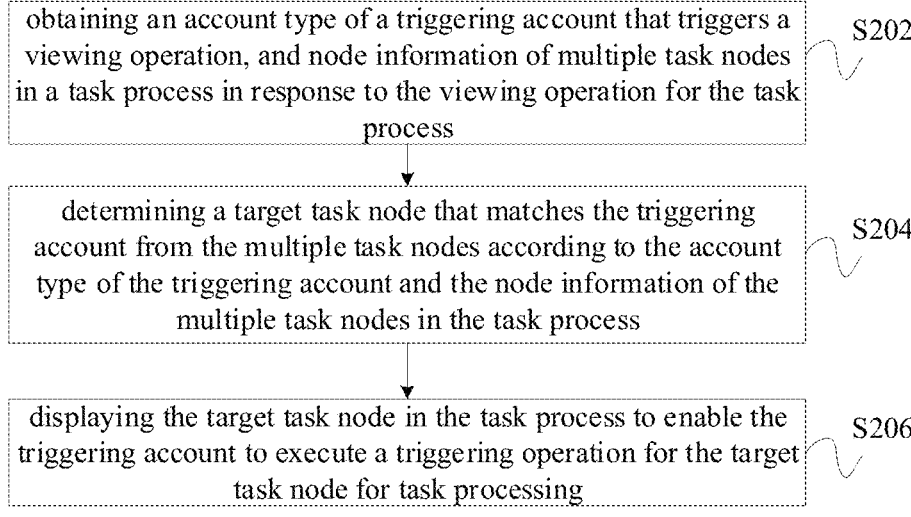

obtaining an account type of a triggering account that triggers a viewing operation, and node information of multiple task nodes in a task process in response to the viewing operation for the task process    S202 determining a target task node that matches the triggering account from the multiple task nodes according to the account type of the triggering account and the node information of the multiple task nodes in the task process    S204 displaying the target task node in the task process to enable the triggering account to execute a triggering operation for the target task node for task processing    S206

FIG. 2

TASK PROCESS MANAGEMENT METHOD, SYSTEM, DEVICE, AND MEDIUM

CROSS-REFERENCE TO RELATED APPLICATION

The present application claims the priority to Chinese Patent Application No. 202310594838.7, filed on May 24, 2023, the entire disclosure of which is incorporated herein by reference as portion of the present application.

TECHNICAL FIELD

The present disclosure relates to a task process management method, a system, a device, a non-transitory computer-readable storage medium, and a computer program product.

BACKGROUND

With the rapid development of computer technology, office automation (OA) applications that combine computer technology with modern office have emerged. OA applications can automate the processing of office transactions, for example, based on OA applications, the automatic advancement of the task process (also known as workflow) can be realized, thereby improving office efficiency.

Specifically, there can be multiple task nodes arranged in the task process, as well as the execution order between multiple task nodes. In this way, OA applications can process task nodes in sequence according to the execution order of task nodes, automatically advancing the task process. Different task nodes can usually be processed by different task processing personnel, who can view the execution status of the task process and process the task nodes that need to be processed.

Multiple task nodes included in the task process can be shown to the task processing personnel when the task processing personnel views the task process. However, for a task process with a plurality of task nodes, task processing personnel find it difficult to clearly and intuitively obtain task node information related to themselves, which reduces the efficiency of task processing.

SUMMARY

The present disclosure provides a task process management method. This method can display task nodes that match an account type, allowing users to only focus on the task nodes related to themselves, improving task processing efficiency and enhancing user experience. The present disclosure also provides a system, a device, and a non-transitory computer-readable storage medium corresponding to the above method.

In a first aspect, the present disclosure provides a task process management method. The method includes:

obtaining an account type of a triggering account that triggers a viewing operation, and node information of multiple task nodes in a task process, in response to the viewing operation for the task process, in which the node information indicates an account type set that has access permission to the task nodes;

determining a target task node that matches the triggering account from the multiple task nodes according to the account type of the triggering account and the node information of the multiple task nodes in the task process;

displaying the target task node in the task process to enable the triggering account to execute a triggering operation for the target task node for task processing.

In some possible implementations, the node information further indicates an operation permission set corresponding to at least one account type in the account type set, the operation permission set includes at least one operation type, and the method further includes:

determining an operation permission set corresponding to the account type of the triggering account according to the node information in response to the triggering operation for the target task node;

displaying a task processing interface corresponding to the target task node, in which the task processing interface provides at least one operation control corresponding to the target task node, a target operation control in at least one operation control is used to execute a target operation, and an operation type of the target operation is at least one operation type in the operation permission set corresponding to the account type of the triggering account.

In some possible implementations, the method further includes:

calling an interface corresponding to the target operation control to execute the target operation and obtain a task processing result of the target task node, in response to a triggering operation for the target operation control in at least one operation control.

In some possible implementations, the displaying the task processing interface corresponding to the target task node includes:

displaying the task processing interface according to a first content identification of the target task node, in which the first content identification is used to indicate information to be processed of the target task node, and the task processing interface includes the information to be processed;

the method further includes:

calling an interface corresponding to the target operation control to execute the target operation and obtain a task processing result of the target task node, in response to a triggering operation for the target operation control in at least one operation control;

displaying the task processing interface according to a second content identification of the target task node, in which the second content identification is used to indicate the task processing result of the target task node, and the task processing interface includes the task processing result of the target task node.

In some possible implementations, the displaying the task processing interface according to a second content identification of the target task node includes:

determining a result display template of the target task node according to the second content identification of the target task node;

filling the task processing result of the target task node into the result display template to display the task processing result of the target task node on the task processing interface.

In some possible implementations, after the obtaining the task processing result of the target task node, the method further includes:

resetting the task processing result of the target task node in response to a reset operation for the target task node.

In some possible implementations, the method further includes:

determining the multiple task nodes in response to a selection operation for multiple candidate task nodes in a task node resource pool;

generating the task process in response to an arrangement operation for the multiple task nodes, in which the arrangement operation is used to indicate dependency relationships of the multiple task nodes in the task process.

In some possible implementations, the generating the task process in response to the arrangement operation for the multiple task nodes includes:

determining a dependent node set of at least one task node in the multiple task nodes in response to a connection operation for the multiple task nodes, in which the dependent node set includes task nodes on which at least one task node is dependent;

determining branching conditions in response to a configuration operation for the multiple task nodes;

generating the task process according to the dependent node set of at least one task node and the branching conditions.

In some possible implementations, the multiple task nodes include a first task node and a second task node, and the method further includes:

storing a task processing result of the first task node;

displaying a task processing interface corresponding to the second task node in response to a triggering operation for the second task node, in which the task processing interface corresponding to the second task node includes the task processing result of the first task node.

In a second aspect, the present disclosure provides a task process management system. The system includes:

an acquisition module, configured to obtain an account type of a triggering account that triggers a viewing operation, and node information of multiple task nodes in a task process, in response to the viewing operation for the task process, in which the node information indicates an account type set that has access permission to the task nodes;

a determination module, configured to determine a target task node that matches the triggering account from the multiple task nodes according to the account type of the triggering account and the node information of the multiple task nodes in the task process;

a display module, configured to display the target task node in the task process to enable the triggering account to execute a triggering operation for the target task node for task processing.

In some possible implementations, the node information further indicates an operation permission set corresponding to at least one account type in the account type set, the operation permission set includes at least one operation type, and the determination module is specifically configured to:

determine an operation permission set corresponding to the account type of the triggering account according to the node information in response to the triggering operation for the target task node;

the display module is specifically configured to:

display a task processing interface corresponding to the target task node, in which the task processing interface provides at least one operation control corresponding to the target task node, a target operation control in at least one operation control is used to execute a target operation, and an operation type of the target operation is at least one operation type in the operation permission set corresponding to the account type of the triggering account.

In some possible implementations, the system further includes:

an execution module, configured to call an interface corresponding to the target operation control to execute the target operation and obtain a task processing result of the target task node, in response to a triggering operation for the target operation control in at least one operation control.

In some possible implementations, the display module is specifically configured to:

display the task processing interface according to a first content identification of the target task node, in which the first content identification is used to indicate information to be processed of the target task node, and the task processing interface includes the information to be processed;

the execution module is specifically configured to:

call an interface corresponding to the target operation control to execute the target operation and obtain a task processing result of the target task node, in response to a triggering operation for the target operation control in at least one operation control;

the display module is specifically configured to:

display the task processing interface according to a second content identification of the target task node, in which the second content identification is used to indicate the task processing result of the target task node, and the task processing interface includes the task processing result of the target task node.

In some possible implementations, the system further includes:

a reset module, configured to reset the task processing result of the target task node in response to a reset operation for the target task node.

In some possible implementations, the system further includes:

an arrangement module, configured to determine the multiple task nodes in response to a selection operation for multiple candidate task nodes in a task node resource pool and generate the task process in response to an arrangement operation for the multiple task nodes, in which the arrangement operation is used to indicate dependency relationships of the multiple task nodes in the task process.

In some possible implementations, the arrangement module is specifically configured to:

determine a dependent node set of at least one task node in the multiple task nodes in response to a connection operation for the multiple task nodes, in which the dependent node set includes task nodes on which at least one task node is dependent;

determine branching conditions in response to a configuration operation for the multiple task nodes;

generate the task process according to the dependent node set of at least one task node and the branching conditions.

In some possible implementations, the multiple task nodes include a first task node and a second task node, and the system further includes:

a storage module, configured to store a task processing result of the first task node;

the display module is specifically configured to:

display a task processing interface corresponding to the second task node in response to a triggering operation for the second task node, in which the task processing interface corresponding to the second task node includes the task processing result of the first task node.

In a third aspect, the present disclosure provides an electronic device, including a processor and a memory. The processor and the memory communicate with each other. The processor is used to execute instructions stored in the memory, causing the electronic device to execute the task process management method as described in the first aspect or any implementation of the first aspect.

In a fourth aspect, the present disclosure provides a non-transitory computer-readable storage medium, the non-transitory computer-readable storage medium stores instructions, and the instructions instructs an electronic device to execute the task process management method as described in the above-mentioned first aspect or any implementation of the first aspect.

In a fifth aspect, the present disclosure provides a computer program product including instructions, which, when running on an electronic device, causing the electronic device to execute the task process management method as described in the first aspect or any implementation of the first aspect.

On the basis of the implementations provided in the above aspects, further combinations may be made to provide more implementations.

From the above technical solutions, it can be seen that the embodiments of the present disclosure have the following advantages:

The embodiments of the present disclosure provides a task process management method. The method can obtain an account type of a triggering account that triggers a viewing operation, and node information of multiple task nodes in a task process, in response to the viewing operation for the task process, in which the node information indicates an account type set that has access permission to the task nodes; then, determine a target task node that matches the triggering account from the multiple task nodes according to the account type of the triggering account and the node information of the multiple task nodes in the task process, and display the target task node in the task process to enable the triggering account to execute a triggering operation for the target task node for task processing.

In this method, different account types have different access permissions to task nodes. Through the account type and the node information of the task node, the target task node that matches the account type can be determined from the task process and displayed. Faced with a complex task process, users only need to focus on task nodes related to themselves, which can improve task processing efficiency and enhance user experience.

BRIEF DESCRIPTION OF DRAWINGS

In order to clearly illustrate the technical method of the embodiments of the present disclosure, the accompanying drawings required in the embodiment will be briefly described below.

FIG. 2 is a flowchart of a task process management method provided in the embodiment of the present disclosure;

DETAILED DESCRIPTION

Figure 1:
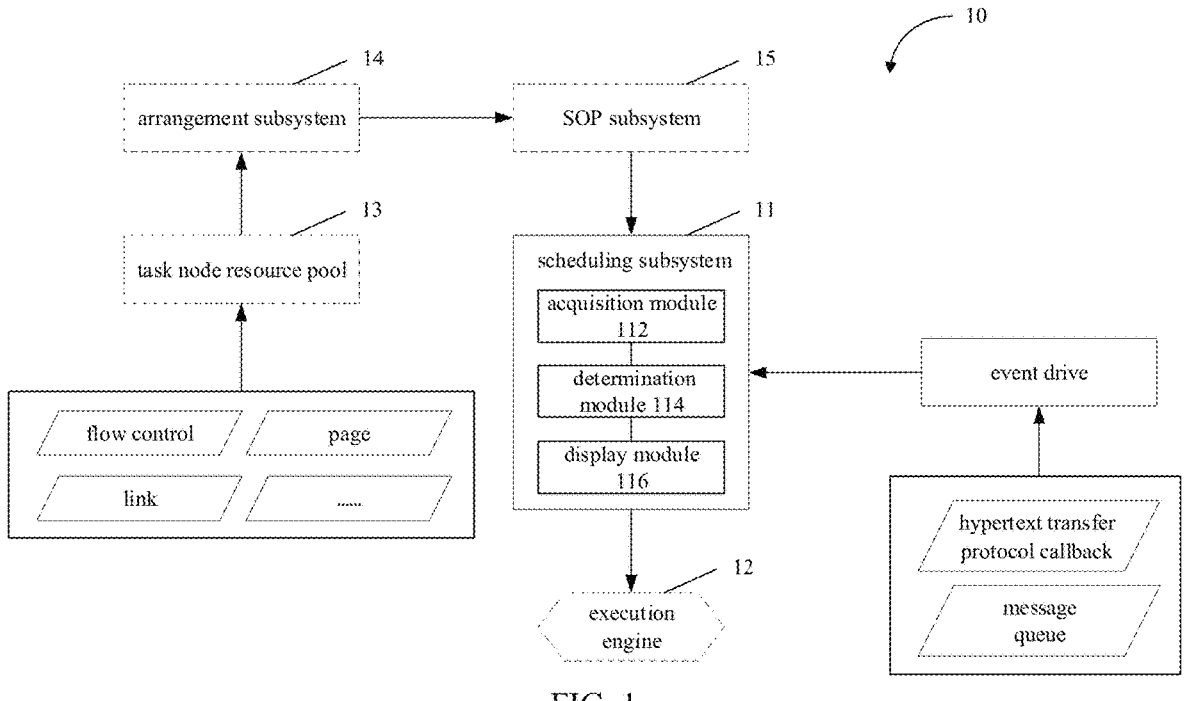
FIG. 1 is an architecture diagram of a task process management system provided in the embodiment of the present disclosure.

The terms "first" and "second" in the embodiment of the present disclosure are only for description purpose and cannot be understood as indicating or implying relative importance or implying the quantity of the indicated technical features. Therefore, the features limited to "first" and "second" may explicitly or implicitly include one or more of these features.

Firstly, some technical terms involved in the embodiment of the present disclosure are introduced.

Task nodes refer to modules used to execute tasks, thereby achieving specific functions or providing specific capabilities. The task to be executed by a task node usually corresponds to an operation. In other words, a task node may complete the processing of a task by triggering an operation.

In different scenarios, the task to be executed by a task node and the corresponding operation may be different. For example, in an e-commerce scenario, a task to be executed by one task node may be to create a promotional activity, while the task to be executed by another task node may be to approve a promotional activity. The operation corresponding to a task for creating a promotional activity may include a creation operation, and an operation corresponding to approving a promotional activity task may include approval and rejection. Furthermore, the operation corresponding to approving a promotional activity task may also include reassigning an approver. For example, in an attendance management scenario, a task to be executed by one task node may include abnormal attendance record reminder task, abnormal attendance record correction task, and abnormal attendance record approval task. The operation corresponding to the abnormal attendance record reminder task includes details viewing, the operations corresponding to the abnormal attendance record correction task include correction and submission, and the operations corresponding to the abnormal attendance record approval task include approval and rejection.

Task process, also known as workflow, refers to an execution sequence composed of a series of task nodes. The dependency relationship between task nodes may represent an execution order of task nodes. Task processors may be set for task nodes. Considering that there may be automatic or manual processing of task nodes, the task processor may be set to the system or the task processing personnel. The task processors for different task nodes may be different. For example, the task processor for creating a promotional activity task may be an operator, and the task processor for approving a promotional activity task may be a manager. It should be noted that the tasks to be executed by one task node may be processed by one or more of task processors. When a task node is set up with multiple task processing personnel, and all of them have completed the task processing, it indicates that the task execution of the task node has been completed.

In order to achieve efficient and convenient generation of task process, a task process arrangement tool (such as a flow arrangement engine) has emerged. The task process arrangement tool supports visual operations. Users (such as flow arrangement people) arrange task nodes by visual operations, such as drag and drop operations and connection operations on the flow arrangement interface, thereby generating a task process.

After generating the task process, other users (such as task processing personnel) may view the task process through a task process interface and perform task processing on the task nodes that need to be executed. Specifically, when a task processing personnel triggers a task process viewing operation on the task process interface, multiple task nodes included in the task process may be shown to the task processing personnel, and the execution order and execution status of multiple task nodes may be shown to the task processing personnel. The task processing personnel may enter a task processing interface by triggering the task node and perform task processing on the task processing interface.

However, for a task process with a plurality of task nodes, task processing personnel need to search for task nodes related to themselves from a plurality of task nodes, and then perform task processing on the task nodes related to themselves, which reduces the efficiency of task processing. If corresponding task processes are developed for each task processing personnel, it will lead to a sharp increase in development costs.

In view of this, the present disclosure provides a task process management method. In this method, the account type (sometimes referred to as a role) of a triggering account (user's account) that triggers a viewing operation, and node information of multiple task nodes in a task process are obtained in response to the viewing operation for the task process. The node information indicates an account type set (sometimes referred to as node's role domain) that has access permission to the task nodes. Then, according to the account type of the triggering account and the node information of the multiple task nodes in the task process, a target task node that matches the triggering account is determined from the multiple task nodes. Then, the target task node is displayed in the task process to enable the triggering account to execute a triggering operation for the target task node for task processing.

In this method, different task nodes can support accounts of different account types to access the node. Through the account type and the node information of the task node, the target task node (such as a task node where the role domain intersects with the role owned by the user) that matches the account type of the triggering account can be determined from the task process, and the target task node can be displayed. Faced with a complex task process, users only need to focus on task nodes related to themselves, which can improve task processing efficiency and enhance user experience. Moreover, this method does not require the development of corresponding task processes for each task processing personnel, significantly reducing development costs.

Furthermore, each account type in the account type set can be configured with an operation permission set corresponding to that account type. The operation permission set includes at least one operation type. By providing, on the task processing interface, operation controls corresponding to the operation types included in the operation permission set, accounts of different account types can perform different operations on task nodes, thereby reducing the possibility of erroneous operations during task processing.

In addition, this method can construct complex, multi-branched task processes to meet different business needs. Moreover, in this method, task processing can be completed in one task processing interface, without the need for users to manually jump between different businesses, greatly simplifying user operations, reducing the difficulty of task processing, and improving user experience.

In order to make the technical solution of the present disclosure clearer and easier to understand, the system architecture of the task process management method provided in the embodiment of the present disclosure is introduced below in conjunction with the accompanying drawings.

Refer to the architecture diagram of a task process management system shown in FIG. 1. The task process management system 10 includes a scheduling subsystem 11, which may also be referred to as a construction subsystem and is responsible for advancing a task process and scheduling tasks. The scheduling subsystem 11 may advances the task process or schedule the tasks under an event drive. The event may be an event in a message queue or a hypertext transfer protocol (HTTP) callback event.

Furthermore, the task process management system 10 may also include at least one execution engine 12, which is configured to automatically execute tasks in the task nodes. In this way, the scheduling subsystem 11 may host the task nodes by means of at least one execution engine 12. For example, the scheduling subsystem 11 may determine an execution engine 12 corresponding to a type of a task node according to the type of the task node, and automatically process the tasks to be executed by the task node by means of the execution engine 12, achieving automatic progress of the task process.

In some possible implementations, the task process management system 10 may also include a task node resource pool 13, an arrangement subsystem 14, or a standard operating procedure (SOP) subsystem 15. The functions of the task node resource pool 13, the arrangement subsystem 14, and the SOP subsystem 15 are described below respectively.

Task node resource pool 13, also known as Atomic Node Market, is configured to create an atomized task node according to business data. The atomized task node refers to the smallest unit that generates the task process, which may usually be reused. The process of creating a task node may be as follows: abstracting a repeatable task into an application programming interface (API), saving the API which is abstracted and related data to an object. The object may be a data structure that includes at least one of the following fields: node type (such as static or dynamic node), operation name, operation identification (ID), operation parameters, and uniform resource locator (URL). The URL may include at least one item from the page URL or third-party URL (link). The above-mentioned object may be stored as a task node in the task node resource pool 13. The task node resource pool 13 is used to provide multiple schedulable task nodes, each of which is used to implement specific functions or provide specific capabilities.

Arrangement subsystem 14, also known as arrangement center, is configured to arrange a task process according to the task nodes provided by the task node resource pool 13, thereby generating the task process. The arrangement subsystem 14 may provide a visual arrangement interface, through which users may select task nodes from the task node resource pool 13 and perform arrangement operations such as connection on the selected task nodes, thereby achieving task process arrangement and generating the task process.

SOP subsystem 14, also known as SOP center, is configured to store flow templates for the task process. The SOP subsystem 14 may be a database, and the flow templates for the task process may be solidified and saved in this database. Furthermore, the scheduling subsystem 11 is configured to obtain the flow templates of the task process and instantiate the flow templates to execute the task process. The scheduling subsystem 11 may generate flow data, such as task processing results, during the execution of the task process.

Correspondingly, The SOP subsystem 14 is also configured to store the above-mentioned flow data.

Next, the process of task process advancement or task scheduling for the scheduling subsystem 11 is described.

As shown in FIG. 1, the scheduling subsystem 11 includes an acquisition module 112, a determination module 114, and a display module 116. The acquisition module 112 is configured to obtain an account type of a triggering account that triggers a viewing operation, and node information of multiple task nodes in a task process, in response to the viewing operation for the task process. The node information indicates an account type set that has access permission to the task nodes. The determination module 114 is configured to determine a target task node that matches the triggering account from the multiple task nodes according to the account type of the triggering account and the node information of the multiple task nodes in the task process. The display module 116 is configured to display the target task node in the task process to enable the triggering account to execute a triggering operation for the target task node for task processing.

It should be noted that the subsystems or the modules in the subsystems in FIG. 1 are divided by function, and the above-mentioned systems or subunits may be implemented by software or hardware. When the above-mentioned subsystems and modules are implemented by software, they may be software functional modules, services, components or plugins. When the above-mentioned subsystems and modules are implemented by hardware, they may be servers or terminals. In other words, various subsystems or modules in the subsystems within the task process management system 10 may be distributed and deployed in a computing device cluster, or the task process management system 10 may be implemented by a computing device cluster, such as including servers and terminals. The system architecture shown in FIG. 1 is only an exemplary architecture. In other possible implementations of the embodiments of the present disclosure, the task process management system 10 may also be other architectures, and the present disclosure does not limit it.

The task process management system 10 for executing the task process management method is introduced above. Next, the task process management method provided in the present disclosure will be described in detail with reference to the accompanying drawings.

Refer to the flowchart of a task process management method shown in FIG. 2, which includes:

S202: obtaining an account type of a triggering account that triggers a viewing operation, and node information of multiple task nodes in a task process in response to the viewing operation for the task process.

Task process, also known as workflow, refers to an execution sequence composed of a series of task nodes. Task nodes refer to modules configured to perform tasks to achieve specific functions or provide specific capabilities. The dependency relationship between task nodes in the task process may represent the execution order of task nodes. Usually, a task process represents a complex business that includes multiple operations, and the multiple task nodes may represent multiple operations respectively. By executing tasks that need to be executed by task nodes according to the execution order of task nodes, complex business processing may be achieved. In this way, the complex business is divided into multiple simple operations which facilitates the processing of complex business.

Considering that the multiple task nodes included in the task process may be executed by different users, users may trigger an operation to view the task process, thereby processing the tasks to be executed by task nodes that the user needs to process. There are various triggering methods for viewing the task process. In some possible implementations, users may trigger the operation of viewing the task process on the main page (such as the task process interface) of the task process management system 10. In other possible implementations, users may also trigger the operation of viewing the task process on a prompt page when receiving prompt messages (such as to-do reminder messages, flow processing reminder messages) sent by the task process management system 10.

In specific implementation, in response to detecting the viewing operation for the task process, the account type of the triggering account that triggers the viewing operation, and the node information of the multiple task nodes in the task process may be obtained. For example, an account identification of the triggering account, including an account name or an account number, may be obtained first, and then the account type of the triggering account may be obtained from an account information database according to the account identification. For example, the multiple task nodes included in the task process may first be obtained according to a flow identification of the task process, and the node information of the multiple task nodes may be obtained based on the node identification of the multiple task nodes included in the task process.

An account type (also known as the role) may include a category identification obtained by classifying accounts from at least one dimension. According to different classification dimensions, account types may be different. For example, if the accounts are classified from the dimension of the type of work, the account types may include an operator account, a developer account, a tester account, etc. For example, if the accounts are classified from the dimension of work region, the account types may include a Northeast region account, a Northwest region account, a Southwest region account, etc.

It should be noted that since accounts may be classified from different dimensions, an account may include multiple account types. For example, the account types of account A may include an operator account and a Northwest region account.

The node information of a task node may be information that describes the task node. The node information of the task node indicates an account type set that has access permission to the task node. In other words, the node information of the task node indicates account types visible to the task node. In some examples, the node information of the task node may include the above-mentioned account type set, also known as the role domain of the task node. Taking the node of creating a great promotional activity as an example, the node information of the task node indicates the following account type set: {operator account, manager account}.

Considering that task nodes are usually stored in the form of objects in the task node resource pool, properties of the corresponding object may be read according to the task node identification to obtain the node information of the task node. The node information may also include node types. Node types may include static task nodes or dynamic task nodes. Different types of task nodes may use different execution engines for task processing.

S204: determining a target task node that matches the triggering account from the multiple task nodes according to the account type of the triggering account and the node information of the multiple task nodes in the task process.

In specific implementation, the target task node may be determined by comparing the account type of the triggering account and the account type set corresponding to multiple task nodes. In some embodiments, task nodes that intersect between the account type of the triggering account and the account type set corresponding to multiple task nodes may be identified as target task nodes.

For example, a task process includes a task node A, a task node B, a task node C, and a task node D. The account type set that has access permission to the task node A is an operator account, the account type set that has access permission to the task node B is a developer account, the account type set that has access permission to the task node C is an operator account and a northeast region account, the account type set that has access permission to the task node D is a northwest region account, the account type of the triggering account A1 is an operator account and a northeast region account, and the account type of the triggering account B1 is an operator account and a northwest region account. Therefore, the target task nodes that match the triggering account A1 are the task node A and the task node C, and the target task nodes that match the triggering account B1 are the task node A, the task node C, and the task node D.

In this way, for the same task process, the target task nodes matched with different account types of triggering accounts may be different, achieving filtering of a plurality of task nodes according to account types, and obtaining target task nodes related to the account types of triggering accounts.

S206: displaying the target task node in the task process to enable the triggering account to execute a triggering operation for the target task node for task processing.

In order to quickly obtain the task node related to the triggering account and process tasks timely, the target task node may be displayed, for example, in the task process interface. In this way, different target task nodes in a same task process may be displayed to the triggering accounts of different account types.

Figure 3:
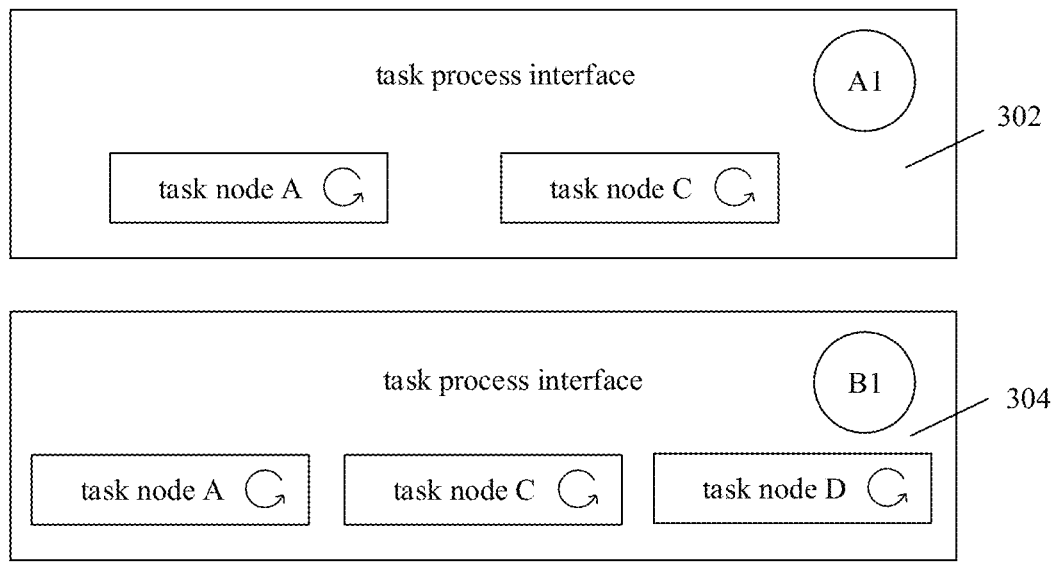
FIG. 3 is a schematic diagram of a task process interface provided in the embodiment of the present disclosure.

A schematic diagram of a task process interface is shown in FIG. 3. The task process interface 302 is a task process interface of the triggering account A1, and the task process interface 304 is a task process interface of the triggering account B1. The task process includes the task node A, the task node B, the task node C, and the task node D. The triggering account A1 triggers a viewing operation for the task process. In response to this viewing operation, the account type of the triggering account A1 and the node information from the task node A to the task node D are obtained, and according to the account type of the triggering account A1 and the node information from the task node A to the task node D, the target task nodes that match the triggering account A1 are determined to be the task node A and the task node C. Therefore, the task node A and the task node C are displayed in the task process interface 302.

Similarly, the triggering account B1 triggers a viewing operation for the task process. In response to this viewing operation, the account type of the triggering account B1 and the node information from the task node A to the task node D are obtained, and according to the account type of the triggering account B1 and the node information from the task node A to the task node D, the target task nodes that match the triggering account B1 are determined to be the task node A, the task node C, and the task node D. Therefore, the task node A, the task node C, and the task node D are displayed in the task process interface 304.

It may be seen that for different types of triggering accounts, task nodes with access permission for the account type of the triggering account may be displayed in the task process interface, thus achieving targeted display of task nodes in the task process.

Based on the above description, the embodiment of the present disclosure provides a task process management method. In this method, different task nodes can support accounts of different account types to access the node. Through the account type and the node information of the task node, the target task node that matches the account type can be determined from the task process, and the target task node can be displayed. Faced with a complex task process, users only need to focus on task nodes related to themselves, which can improve task processing efficiency and enhance user experience.

The previous text introduces the process of displaying task nodes in the task process, and the following will provide a detailed introduction to the process of task processing.

A target task node may be executed by multiple triggering accounts, and different triggering accounts may have different executable operations on the target task node. For example, some triggering accounts may perform viewing operations, while others may perform viewing and modifying operations.

Based on this, in some possible implementations, the node information of task nodes may also indicate an operation permission set corresponding to at least one account type in the account type set. The operation permission set includes at least one operation type. Specifically, at least one of the operation name, the operation ID, or the operation parameter of the at least one operation type may be recorded in the operation permission set. In this way, based on the account type of the triggering account, the executable operations of the target task node are restricted to avoid erroneous operations against the task node.

The specific steps of task processing may include:

A2: determining an operation permission set corresponding to the account type of the triggering account according to the node information in response to the triggering operation for the target task node.

A4: displaying a task processing interface corresponding to the target task node.

The task processing interface may provide at least one operation control corresponding to the target task node, and a target operation control in at least one operation control is used to execute a target operation. For example, when the target operation control is triggered, the target operation is executed, and the operation type of the target operation is at least one operation type in the operation permission set corresponding to the account type of the triggering account.

In this way, users may perform the target operation by triggering at least one operation control in the task processing interface to process the target task node.

A6: calling an interface corresponding to the target operation control to execute the target operation and obtain a task processing result of the target task node, in response to a triggering operation for the target operation control in at least one operation control.

The interface types of different target task nodes may be different. For example, the interface may be an application programming interface (API) or a remote procedure call (RPC) interface.

A specific example will be used to illustrate below. For the target task node "create a promotional activity", the operation permission set corresponding to the account type of the triggering account A1 includes an operation for viewing existing promotional activities and an operation for creating new promotional activities. Therefore, the task processing interface of the triggering account Almay include an operation control for viewing existing promotional activities and an operation control for creating new promotional activities. In response to a triggering operation of the triggering account A1 on one of the operation controls (such as the operation control for creating new promotional activities), the corresponding interface of the operation control may be called to execute the target operation (such as creating a new promotional activity), thereby obtaining the task processing result (such as a promotional activity ID).

In some embodiments, in order to improve task processing efficiency, the task processing interface may be used to display the information related to the task. The specific steps of task processing may include:

B2: determining the operation permission set corresponding to the account type of the triggering account according to the node information in response to the triggering operation for the target task node.

B4: displaying the task processing interface according to a first content identification of the target task node.

The first content identification is used to indicate information to be processed of the target task node. The task processing interface includes the information to be processed. The information to be processed refers to the information that needs to be processed when executing the target task node. For example, taking the target task node "create a promotional activity" as an example, the information to be processed may include one or more of the name, the start time, the end time, and the promotion form of the promotional activity.

By displaying the information to be processed on the task processing interface, users do not need to manually jump between different businesses. In this way, by using the information to be processed to assist in triggering accounts for task processing, tasks may be processed in one task processing interface, thereby improving task processing efficiency.

B6: calling an interface corresponding to the target operation control to execute the target operation and obtain a task processing result of the target task node, in response to a triggering operation for the target operation control in at least one operation control.

B8: displaying the task processing interface according to a second content identification of the target task node.

The second content identification is used to indicate the task processing result of the target task node, and the task processing result includes the task processing result of the target task node. In some embodiments, the result display template of the target task node may be determined according to the second content identification of the target task node, and the task processing result may be filled into the result display template. In this way, the task processing result of the target task node may be displayed on the task processing interface.

After completing the task processing, by directly displaying the task processing result on the task processing interface, there is no need to jump to other interfaces (such as a result viewing interface) to view the task processing result. Completing the task processing and viewing the task processing result in one task processing interface improves the user's task processing experience.

It should be noted that, in the embodiment of the present disclosure, there is no restriction on the type of the first content identification or the second content identification.

For example, the first content identification or the second content identification may be a uniform resource locator (URL).

Taking the target task node "create a promotional activity" as an example for explanation. According to the first content identification of the target task node, a candidate promotional activity list page may be displayed on the task processing interface. The triggering account may perform the operation of creating a new promotional activity in the candidate promotional activity list page to obtain a promotional activity ID that is created. Then, according to the second content identification of the target task node, the promotional activity ID is displayed on the task processing interface. In this way, based on the content identification of the target task node, task processing may be completed in one task processing interface without the need to jump to multiple different systems, thereby improving the convenience of task processing for users.

In addition, the embodiments of the present disclosure may also achieve resetting of task nodes. Specifically, in response to a reset operation for the target task node, the task processing result of the target task node is reset. As shown in FIG. 3, in response to an operation of triggering a reset control next to the target task node, the reset of the processing result of the target task node may be achieved by releasing the storage space of the processing result. In this way, the task processing result of the target task node is reset to zero, and the triggering account can execute the target task node again to obtain a new task processing result of the target task node, and achieve the update of the task processing result.

During the process of executing the task process, data sharing can also be achieved between task nodes. Specifically, the multiple task nodes may include a first task node and a second task node, and may store a task processing result of the first task node, and display a task processing interface corresponding to the second task node in response to a triggering operation for the second task node. The task processing interface includes the task processing result of the first task node.

By storing the task processing result of the first task node in the form of shared storage, other task nodes (such as the second task node) may obtain the task processing result of the first task node and use the task processing result of the first task node for task processing. In this way, the data circulation between different task nodes can be not limited to the dependency relationship of task nodes. Nodes without dependency relationship or direct dependency relationship can also use the task processing results of other task nodes for task processing, thereby achieving the data sharing among multiple task nodes in the task process.

The previous text introduces the task processing process, and the following will introduce the arrangement process of the task process in the embodiment of the present disclosure.

The arrangement for the task process refers to the process of arranging multiple task nodes into a task process according to their dependency relationships. Specifically, in response to a selection operation for multiple candidate task nodes in a task node resource pool, multiple task nodes may be determined, and then in response to an arrangement operation for the multiple task nodes, the task process may be generated. The task node resource pool may store multiple candidate task nodes for task process arrangement, and the arrangement operation is used to indicate the dependency relationships of the multiple task nodes in the task process.

Figure 4:
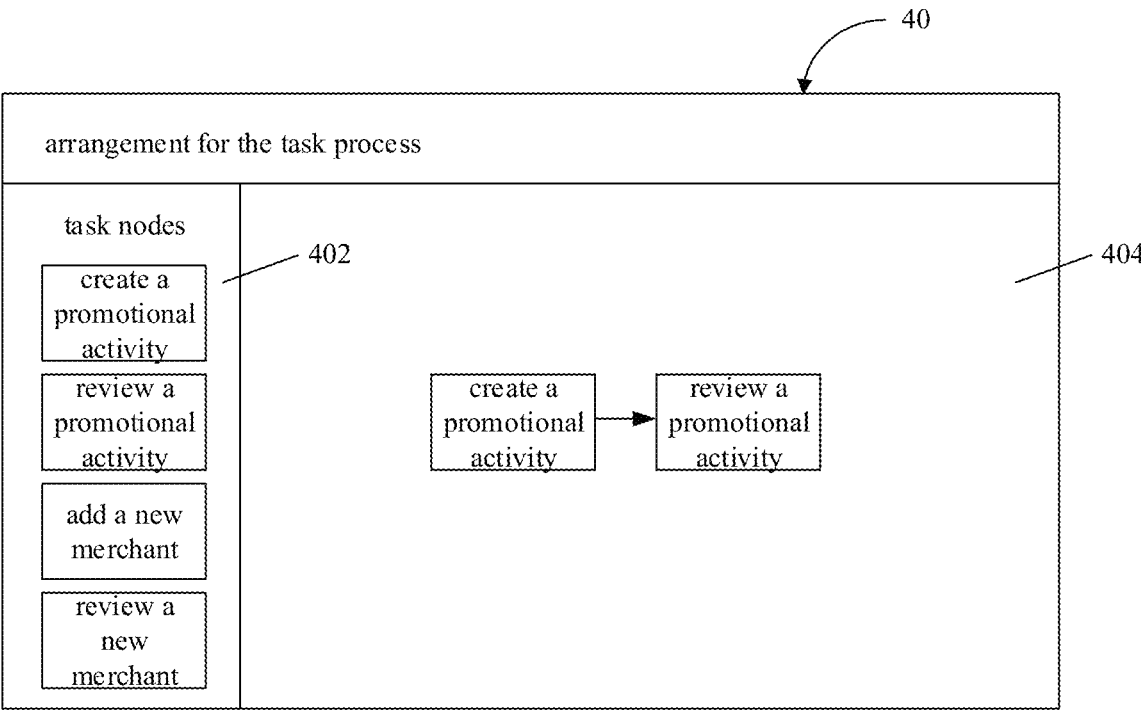
FIG. 4 is a schematic diagram of a flow arrangement interface provided in the embodiment of the present disclosure.

In some possible implementations, task process may be arranged by means of the flow arrangement interface, thus achieving visual flow arrangement. Refer to the schematic diagram of a flow arrangement interface shown in FIG. 4, the flow arrangement interface 40 may include a task node display area 402 and a task node arrangement area 404. In the task node display area 402, multiple candidate task nodes in the task node resource pool may be displayed in the form of task node icons. A user (such as a flow arrangement personnel) may drag and drop multiple candidate task node icons to the task node arrangement area 404 by dragging and dropping the candidate task node icons, achieving the selection operation for multiple task nodes included in the task process.

The flow arrangement personnel may perform arrangement operations on multiple task nodes in the task node arrangement area 404. In some embodiments, the dependency relationship of the multiple task nodes may be represented by the pointing of arrows, and the task node A pointing to the task node B may indicate that the dependent node of the task node A is the task node B.

Considering the increasing complexity of business scenarios, the dependency relationships between task nodes are also becoming more complex. In the embodiment of the present disclosure, a multi-branched (e.g., tree-like) task process may be generated by determining a dependent node set of the task node and branching conditions. Specifically, in response to a connection operation for the multiple task nodes, a dependent node set of at least one task node in the multiple task nodes is determined. The dependent node set includes task nodes on which at least one task node is dependent. In response to a configuration operation for the multiple task nodes, branching conditions are determined, and a task process may be generated according to the dependent node set of at least one task node and the branching conditions.

By determining the dependent node set of task nodes based on the connection relationships between task nodes, the dependent nodes of the task nodes can be determined. Then, by configuring the branching conditions, the execution direction of the task process can be determined. In this way, generating multi-branched and complex task process can meet complex business scenarios and various user needs.

It should be noted that, the above-mentioned embodiments provided in the present disclosure may be implemented independently or in combination according to requirements, and the present disclosure does not limit this.

The previous text provides a detailed introduction to the task process management method provided in the embodiment of the present disclosure combined with FIG. 1 to FIG. 4. The system and device provided in the embodiment of the present disclosure will be introduced in conjunction with the accompanying drawings below.

Refer to the schematic diagram of a task process management system shown in FIG. 1, the system includes:

An acquisition module 112 which is configured to obtain an account type of a triggering account that triggers a viewing operation, and node information of multiple task nodes in a task process, in response to the viewing operation for the task process, in which the node information indicates an account type set that has access permission to the task nodes;

A determination module 114 which is configured to determine a target task node that matches the triggering account from the multiple task nodes according to the account type of the triggering account and the node information of the multiple task nodes in the task process;

A display module 116 which is configured to display the target task node in the task process to enable the triggering account to execute a triggering operation for the target task node for task processing.

In some possible implementations, the node information also indicates an operation permission set corresponding to at least one account type in the account type set. The operation permission set includes at least one operation type, and the determination module 114 is specifically configured to:

Determine an operation permission set corresponding to the account type of the triggering account according to the node information in response to the triggering operation for the target task node;

The display module 116 is specifically configured to:

Display a task processing interface corresponding to the target task node. The task processing interface provides at least one operation control corresponding to the target task node. The target operation control in at least one operation control is used to execute a target operation, and an operation type of the target operation is at least one operation type in the operation permission set corresponding to the account type of the triggering account.

In some possible implementations, the system 10 further includes:

An execution module which is configured to an interface corresponding to the target operation control to execute the target operation and obtain a task processing result of the target task node, in response to a triggering operation for the target operation control in at least one operation control.

In some possible implementations, the display module 116 is specifically configured to:

Display the task processing interface according to a first content identification of the target task node, in which the first content identification is used to indicate information to be processed of the target task node, and the task processing interface includes the information to be processed;

The execution module is specifically configured to:

calling an interface corresponding to the target operation control to execute the target operation and obtain a task processing result of the target task node, in response to a triggering operation for the target operation control in at least one operation control;

The display module 116 is further configured to:

Display the task processing interface according to a second content identification of the target task node, in which the second content identification is used to indicate the task processing result of the target task node, and the task processing interface includes the task processing result of the target task node.

In some possible implementations, the system 10 further includes:

A reset module which is configured to reset the task processing result of the target task node in response to a reset operation for the target task node.

In some possible implementations, the system 10 further includes:

An arrangement module which is configured to determine the multiple task nodes in response to a selection operation for multiple candidate task nodes in a task node resource pool; generate the task process in response to an arrangement operation for the multiple task nodes, in which the arrangement operation is used to indicate dependency relationships of the multiple task nodes in the task process.

In some possible implementations, the arrangement module is specifically configured to:

Determine a dependent node set of at least one task node in the multiple task nodes in response to a connection operation for the multiple task nodes. The dependent node set includes task nodes on which at least one task node is dependent;

Determine branching conditions in response to a configuration operation for the multiple task nodes;

Generate the task process according to the dependent node set of at least one task node and the branching conditions.

In some possible implementations, the multiple task nodes include a first task node and a second task node, and the system further includes:

A storage module which is configured to store a task processing result of the first task node;

The display module 116 is specifically configured to:

Display a task processing interface corresponding to the second task node in response to a triggering operation for the second task node. The task processing interface corresponding to the second task node includes the task processing result of the first task node.

The task process management system 10 according to the embodiment of the present disclosure may correspond to the execution of the method described in the embodiment of the present disclosure, and the above and other operations and/or functions of each module/unit of the task process management system 10 are respectively to achieve the corresponding processes of each method in the embodiment shown in FIG. 2, which will not be repeated here for simplicity.

The embodiment of the present disclosure also provides an electronic device. This electronic device is specifically used to implement the functions of the task process management system 10 in the embodiment shown in FIG. 1.

Figure 5:
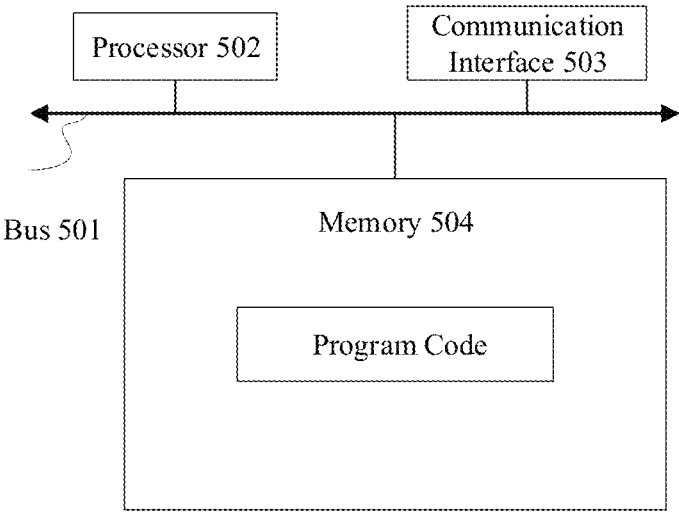
FIG. 5 is a schematic diagram of the structure of an electronic device provided in the embodiment of the present disclosure.

FIG. 5 provides a schematic diagram of the structure of an electronic device 500. As shown in FIG. 5, the electronic device 500 includes a bus 501, a processor 502, a communication interface 503, and a memory 504. The processor 502, the memory 504, and the communication interface 503 communicate through the bus 501.

The bus 501 may be a peripheral component interconnect (PCI) bus or an extended industry standard architecture (EISA) bus, etc. Buses may be divided into address buses, data buses, control buses, etc. For case of representation, only one thick line is used in FIG. 5 to represent the bus 501, but it does not mean that there is only one bus or one type of bus.

The processor 502 may be any one or more of the following processors: central processing unit (CPU), graphics processing unit (GPU), microprocessor (MP), or digital signal processor (DSP).

The communication interface 503 is used for external communication. For example, the communication interface 503 may be used to communicate with terminals. The communication interface 503 is used to receive viewing operations triggered by the terminal for the task process, so that the terminal can display the target task node.

The memory 504 may include volatile memory, such as random access memory (RAM). The memory 504 may also include non-volatile memory, such as read-only memory (ROM), flash memory, hard disk drive (HDD), or solid state drive (SSD).

The memory 504 stores executable code, and the processor 502 executes the executable code to execute the above-mentioned task process management method.

Specifically, in the case of implementing the embodiment shown in FIG. 1, and in the case where the various modules or units of the task process management system 10 described in the embodiment of FIG. 1 are implemented by means of software, the software or program code required to execute the functions of each module/unit in FIG. 1 may be partially or fully stored in the memory 504. The processor 502 executes the program code corresponding to each module stored in the memory 504 and executes the above-mentioned task process management method.

The embodiment of the present disclosure also provides a non-transitory computer-readable storage medium. The non-transitory computer-readable storage medium may be any available medium that is stored in computing devices, or one or more available medium that is included in a data storage device such as a data center. The available medium may be magnetic medium (e.g., floppy disk, hard disk, tape), optical medium (e.g., DVD), or semiconductor medium (e.g., solid state drive), etc. The non-transitory computer-readable storage medium include instructions that instruct the computing device to execute the above-mentioned task process management method applied to the task process management system 10.

The embodiment of the present disclosure also provides a computer program product, which includes one or more computer instructions. When loading and executing the computer instructions on a computing device, the processes or functions described in the embodiment of the present disclosure are generated in whole or in part.

The computer instructions may be stored in a non-transitory computer-readable storage medium or transmitted from one non-transitory computer-readable storage medium to another. For example, the computer instructions may be transmitted from one website site, computer or data center to another website site, computer or data center via wired (such as coaxial cable, fiber optic, digital user line (DSL)) or wireless (such as infrared, wireless, microwave, etc.).

When the computer program product is executed by a computer, the computer executes any one of the above-mentioned task process management methods. The computer program product may be a software installation package, and may be downloaded and executed on the computer if any one of the above-mentioned task process management methods is required.

The flowcharts and block diagrams in the drawings illustrate the architecture, function, and operation of possible implementations of systems, methods, and computer program products according to various embodiments of the present disclosure. In this regard, each block in the flowcharts or block diagrams may represent a module, a program segment, or a portion of code, including one or more executable instructions for implementing specified logical functions. It should also be noted that, in some alternative implementations, the functions noted in the blocks may also occur out of the order noted in the drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the unit/module does not constitute a limitation of the unit itself under certain circumstances.

The functions described herein above may be performed, at least partially, by one or more hardware logic components. For example, without limitation, available exemplary types of hardware logic components include: a field program-mable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable sig-nal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical con-nection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

It should be understood that, in the present disclosure, "at least one (item)" refers to one or more, and "a plurality of" refers to two or more. "And/or" is used to describe the association relationship between associated objects, indicat-ing that there may be three relationships. For example, "A and/or B" may indicate: only A exists, only B exists, and both A and B exist simultaneously, where A, B may be singular or plural. The character "/" generally indicates that the associated objects before and after are in a kind of "or" relationship. "At least one (item)" or similar expressions refer to any combination of these items, including any combination of single (item) or multiple (items). For example, at least one (item) of a, b, or c may indicate: a, b, c, "a and b", "a and c", "b and c", or "a, b, and c", where a, b, and c may be singular or plural.

It should be noted that in the present disclosure, relational terms such as "first," "second," etc. are only used to distin-guish one entity or operation from another entity or opera-tion, and do not necessarily require or imply the existence of any actual relationship or order between these entities or operations. Furthermore, the terms "comprise," "compris-ing," "include," "including," etc., or any other variant thereof are intended to cover non-exclusive inclusion, such that a process, method, article or device comprising a set of elements includes not only those elements, but also other elements not expressly listed, or other elements not expressly listed for the purpose of such a process, method, article or device, or elements that are inherent to such process, method, article or device. Without further limita-tion, an element defined by the phrase "includes a . . . " does not preclude the existence of additional identical elements in the process, method, article or device that includes the element.

The steps of the methods or algorithms described in the embodiments of the present disclosure may be implemented directly with hardware, software modules executed by a processor, or a combination of both. The software modules may be placed in random access memory (RAM), memory, read-only memory (ROM), electrically programmable ROM, electrically erasable programmable ROM, registers, hard disks, removable disks, CD-ROMs, or any other form of storage medium known in the art.

The above-mentioned description of the disclosed embodiments enables those skilled in the art to implement or use the present disclosure. Various modifications to these embodiments will be readily apparent to those skilled in the art, and the generic principles defined herein may be prac-ticed in other embodiments without departing from the spirit or scope of the present disclosure. Therefore, the present disclosure is not to be limited to the embodiments described herein but is to be accorded the widest scope consistent with the principles and novel features disclosed herein.

The invention claimed is:

1. A task process management system, comprising:

a scheduling subsystem, configured for advancing a task process and scheduling tasks, wherein the task process comprises a plurality of task nodes;

at least one execution engine, configured for automati-cally executing a task in each task node;

a task node resource pool, configured for storing node information of each task node, wherein the node infor-mation of each task node indicates an account type set that comprises at least one account type having access permission to each task node;

a memory, configured for storing an account information database that comprises an account type of each account;

wherein the scheduling subsystem is configured for:

in response to a viewing operation for the task process triggered on a task process page or a prompt page of the task process management system, obtaining, from the memory, an account type of a triggering account that triggers the viewing operation, and reading, from the task node resource pool, node information of the plu-rality of task nodes;

determining at least one task node that matches the triggering account from the plurality of task nodes, according to the account type of the triggering account and the node information of the plurality of task nodes in the task process;

displaying, on the task process page, the at least one task node to which the account type of the triggering account has access permission, so as to perform task processing in response to a triggering operation of the triggering account for the at least one task node;

the node information of each task node further indicates an operation permission set corresponding to each of the at least one account type comprised in the account type set of each task node, wherein each operation permission set comprises at least one operation type, the task process management system is further config-ured for:

in response to the triggering operation for the at least one task node displayed on the task process page, deter-mining an operation permission set corresponding to the account type of the triggering account according to the node information of a triggered task node, wherein the operation permission set corresponding to the account type of the triggering account comprises one or more operation types;

displaying a task processing interface corresponding to the triggered task node, wherein at least one operation control corresponding to the triggered task node is provided on the task processing interface, and the at least one operation control is in one-to-one correspondence with the one or more operation types;

in response to a triggering operation for a first operation control among the at least one operation control on the task processing interface, executing, by a corresponding execution engine, an operation corresponding to the first operation control.

2. The system according to claim 1, wherein, executing the operation corresponding to the first operation control, comprises:

calling an interface corresponding to the first operation control to execute the operation and obtain a task processing result of the triggered task node, in response to the triggering operation for the first operation control.

3. The system according to claim 2, wherein, after the obtaining the task processing result of the triggered task node, the system is further configured for:

resetting the task processing result of the triggered task node in response to a reset operation for the triggered task node.

4. The system according to claim 1, wherein the displaying the task processing interface corresponding to the triggered task node, comprises:

displaying the task processing interface according to a first content identification of the triggered task node, wherein the first content identification is used to indicate information to be processed of the triggered task node, and the task processing interface comprises the information to be processed;

wherein the system is further configured for:

calling an interface corresponding to the first operation control to execute the operation and obtain a task processing result of the triggered task node, in response to a triggering operation for the first operation control;

displaying the task processing interface according to a second content identification of the triggered task node, wherein the second content identification is used to indicate the task processing result of the triggered task node, and the task processing interface comprises the task processing result of the triggered task node.

5. The system according to claim 4, wherein, after the obtaining the task processing result of the triggered task node, the system is further configured for:

resetting the task processing result of the triggered task node in response to a reset operation for the triggered task node.

6. The system according to claim 1, wherein the task process management system further comprises an arrangement subsystem, the arrangement subsystem is configured for:

determining the plurality of task nodes in response to a selection operation for a plurality of candidate task nodes in the task node resource pool;

generating the task process in response to an arrangement operation for the plurality of task nodes, wherein the arrangement operation is used to indicate dependency relationships of the plurality of task nodes in the task process.

7. The system according to claim 6, wherein the generating the task process in response to the arrangement operation for the plurality of task nodes comprises:

determining a dependent node set of at least one task node in the plurality of task nodes in response to a connection operation for the plurality of task nodes, wherein the dependent node set comprises task nodes on which at least one task node is dependent;

determining branching conditions in response to a configuration operation for the plurality of task nodes;

generating the task process according to the dependent node set of at least one task node and the branching conditions.

8. The system according to claim 1, wherein the plurality of task nodes comprise a first task node and a second task node, and the task process management system is further configured for:

storing a task processing result of the first task node in a form of shared storage, where the shared storage indicates that the second task node is capable of obtaining the task processing result;

displaying a task processing interface corresponding to the second task node in response to a triggering operation for the second task node, wherein the task processing interface corresponding to the second task node comprises the task processing result of the first task node.

9. An electronic device, comprising a processor and a memory;

wherein the processor is used to execute instructions stored in the memory, causing the electronic device to execute a task process management method, and the method comprises:

in response to a viewing operation for a task process triggered on a task process page or a prompt page of a task process management system, obtaining, by a scheduling subsystem comprised in the task process management system, from a memory comprised in the task process management system, an account type of a triggering account that triggers the viewing operation, and reading, from a task node resource pool comprised in the task process management system, node information of a plurality of task nodes in the task process, wherein the node information of each task node indicates an account type set that comprises at least one account type having access permission to each task node;

determining, by the scheduling subsystem, at least one task node that matches the triggering account from the plurality of task nodes, according to the account type of the triggering account and the node information of the plurality of task nodes in the task process;

displaying, on the task process page, the at least one task node to which the account type of the triggering account has access permission, so as to perform task processing in response to a triggering operation of the triggering account for the at least one task node;

wherein the node information of each task node further indicates an operation permission set corresponding to each of the at least one account type comprised in the account type set of each task node, wherein each operation permission set comprises at least one operation type, the task process management system further comprises at least one execution engine, configured for automatically executing a task in each task node, the method further comprises:

in response to the triggering operation for the at least one task node displayed on the task process page, determining an operation permission set corresponding to the account type of the triggering account according to the node information of a triggered task node, wherein the operation permission set corresponding to the account type of the triggering account comprises one or more operation types;

displaying a task processing interface corresponding to the triggered task node, wherein at least one operation control corresponding to the triggered task node is provided on the task processing interface, and the at least one operation control is in one-to-one correspondence with the one or more operation types;

in response to a triggering operation for a first operation control among the at least one operation control on the task processing interface, executing, by a corresponding execution engine, an operation corresponding to the first operation control.

10. The electronic device according to claim 9, wherein, executing the operation corresponding to the first operation control, comprises:

calling an interface corresponding to the first operation control to execute the operation and obtain a task processing result of the triggered task node, in response to the triggering operation for the first operation control.

11. The electronic device according to claim 10, wherein, after the obtaining the task processing result of the triggered task node, the method further comprises:

resetting the task processing result of the triggered task node in response to a reset operation for the triggered task node.

12. The electronic device according to claim 9, wherein the displaying the task processing interface corresponding to the triggered task node, comprises:

displaying the task processing interface according to a first content identification of the triggered task node, wherein the first content identification is used to indicate information to be processed of the triggered task node, and the task processing interface comprises the information to be processed;

the method further comprises:

calling an interface corresponding to the first operation control to execute the operation and obtain a task processing result of the triggered task node, in response to a triggering operation for the first operation control;

displaying the task processing interface according to a second content identification of the triggered task node, wherein the second content identification is used to indicate the task processing result of the triggered task node, and the task processing interface comprises the task processing result of the triggered task node.

13. The electronic device according to claim 12, wherein, after the obtaining the task processing result of the triggered task node, the method further comprises:

resetting the task processing result of the triggered task node in response to a reset operation for the triggered task node.

14. The electronic device according to claim 9, wherein the task process management system further comprises an arrangement subsystem, the arrangement the method further comprises:

determining, by the arrangement subsystem, the plurality of task nodes in response to a selection operation for a plurality of candidate task nodes in the task node resource pool;

generating, by the arrangement subsystem, the task process in response to an arrangement operation for the plurality of task nodes, wherein the arrangement operation is used to indicate dependency relationships of the plurality of task nodes in the task process.

15. The electronic device according to claim 14, wherein the generating the task process in response to the arrangement operation for the plurality of task nodes comprises:

determining a dependent node set of at least one task node in the plurality of task nodes in response to a connection operation for the plurality of task nodes, wherein the dependent node set comprises task nodes on which at least one task node is dependent;

determining branching conditions in response to a configuration operation for the plurality of task nodes;

generating the task process according to the dependent node set of at least one task node and the branching conditions.

16. The electronic device according to claim 9, wherein the plurality of task nodes comprise a first task node and a second task node, and the method further comprises:

storing a task processing result of the first task node in a form of shared storage, where the shared storage indicates that the second task node is capable of obtaining the task processing result;

displaying a task processing interface corresponding to the second task node in response to a triggering operation for the second task node, wherein the task processing interface corresponding to the second task node comprises the task processing result of the first task node.

17. A non-transitory computer-readable storage medium comprising instructions, wherein the instructions instruct an electronic device to execute a task process management method, and the method comprises:

in response to a viewing operation for a task process triggered on a task process page or a prompt page of a task process management system, obtaining, by a scheduling subsystem comprised in the task process management system, from a memory comprised in the task process management system, an account type of a triggering account that triggers the viewing operation, and reading, from a task node resource pool comprised in the task process management system, node information of a plurality of task nodes in the task process, wherein the node information of each task node indicates an account type set that comprises at least one account type having access permission to each task node;

determining, by the scheduling subsystem, at least one task node that matches the triggering account from the plurality of task nodes, according to the account type of the triggering account and the node information of the plurality of task nodes in the task process;

displaying, on the task process page, the at least one task node to which the account type of the triggering account has access permission, so as to perform task processing in response to a triggering operation of the triggering account for the at least one task node;

wherein the node information of each task node further indicates an operation permission set corresponding to each of the at least one account type comprised in the account type set of each task node, wherein each operation permission set comprises at least one operation type, the task process management system further comprises at least one execution engine, configured for automatically executing a task in each task node, the method further comprises:

in response to the triggering operation for the at least one task node displayed on the task process page, determining an operation permission set corresponding to the account type of the triggering account according to the node information of a triggered task node, wherein the operation permission set corresponding to the account type of the triggering account comprises one or more operation types;

displaying a task processing interface corresponding to the triggered task node, wherein at least one operation control corresponding to the triggered task node is provided on the task processing interface, and the at least one operation control is in one-to-one correspondence with the one or more operation types;

in response to a triggering operation for a first operation control among the at least one operation control on the task processing interface, executing, by a corresponding execution engine, an operation corresponding to the first operation control.

18. The non-transitory computer-readable storage medium according to claim 17, wherein the task process management system further comprises an arrangement subsystem, the method further comprises:

determining, by the arrangement subsystem, the plurality of task nodes in response to a selection operation for a plurality of candidate task nodes in the task node resource pool;

generating, by the arrangement subsystem, the task process in response to an arrangement operation for the plurality of task nodes, wherein the arrangement operation is used to indicate dependency relationships of the plurality of task nodes in the task process.

* * * * *